United States Patent
Ogawa

(10) Patent No.: US 7,661,079 B2
(45) Date of Patent: Feb. 9, 2010

(54) DESIGNING AND OPERATING OF SEMICONDUCTOR INTEGRATED CIRCUIT BY TAKING INTO ACCOUNT PROCESS VARIATION

(75) Inventor: Toshio Ogawa, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 332 days.

(21) Appl. No.: 11/525,895

(22) Filed: Sep. 25, 2006

(65) Prior Publication Data
US 2007/0226660 A1 Sep. 27, 2007

(30) Foreign Application Priority Data
Mar. 24, 2006 (JP) ............................. 2006-083336

(51) Int. Cl.
*G06F 17/50* (2006.01)
(52) U.S. Cl. ............................................. 716/4; 716/1
(58) Field of Classification Search ................. 716/4–6, 716/1
See application file for complete search history.

(56) References Cited

U.S. PATENT DOCUMENTS 7,475,366 B2 * 1/2009 Kuemerle et al. ............. 716/1
2004/0216067 A1 * 10/2004 Tanaka et al. ................. 716/10
2008/0034337 A1 * 2/2008 Kuemerle et al. .............. 716/6

FOREIGN PATENT DOCUMENTS

JP 2002-324097 11/2002
JP 2002-353083 12/2002

* cited by examiner

*Primary Examiner*—Jack Chiang
*Assistant Examiner*—Binh C Tat
(74) *Attorney, Agent, or Firm*—Fujitsu Patent Center

(57) ABSTRACT

A method of designing a semiconductor integrated circuit includes defining a tolerable range in which an operating temperature and an operating power supply voltage of a semiconductor integrated circuit are allowed to vary, computing a target temperature and a target power supply voltage that cancel variation in circuit characteristics caused by process variation of the semiconductor integrated circuit, separately for each circuit characteristic responsive to the process variation, and designing the semiconductor integrated circuit such that the semiconductor integrated circuit properly operates with any temperature and power supply voltage within the tolerable range based on an assumption that the semiconductor integrated circuit is to operate within the tolerable range centered substantially at the target temperature and target power supply voltage.

1 Claim, 14 Drawing Sheets

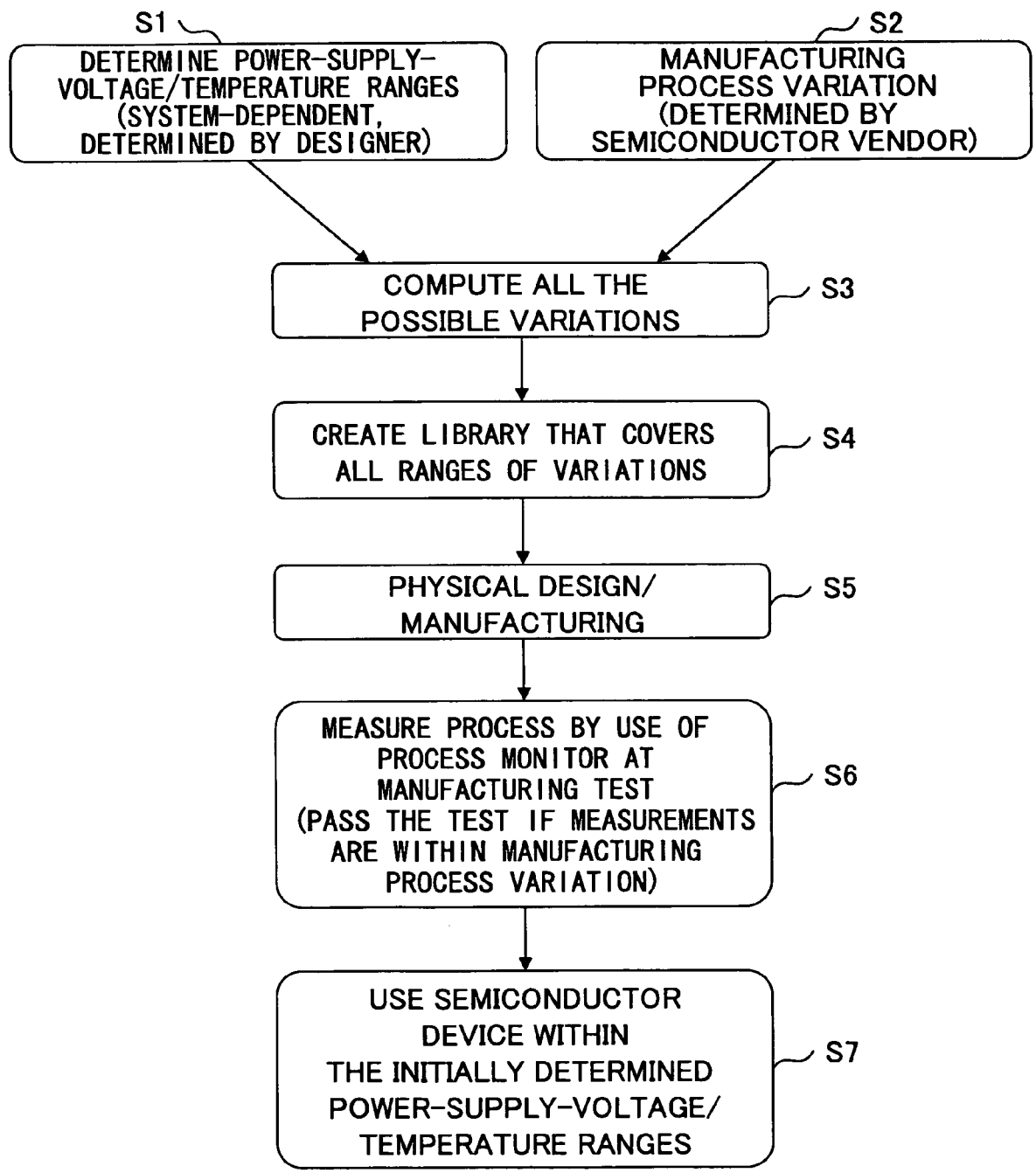

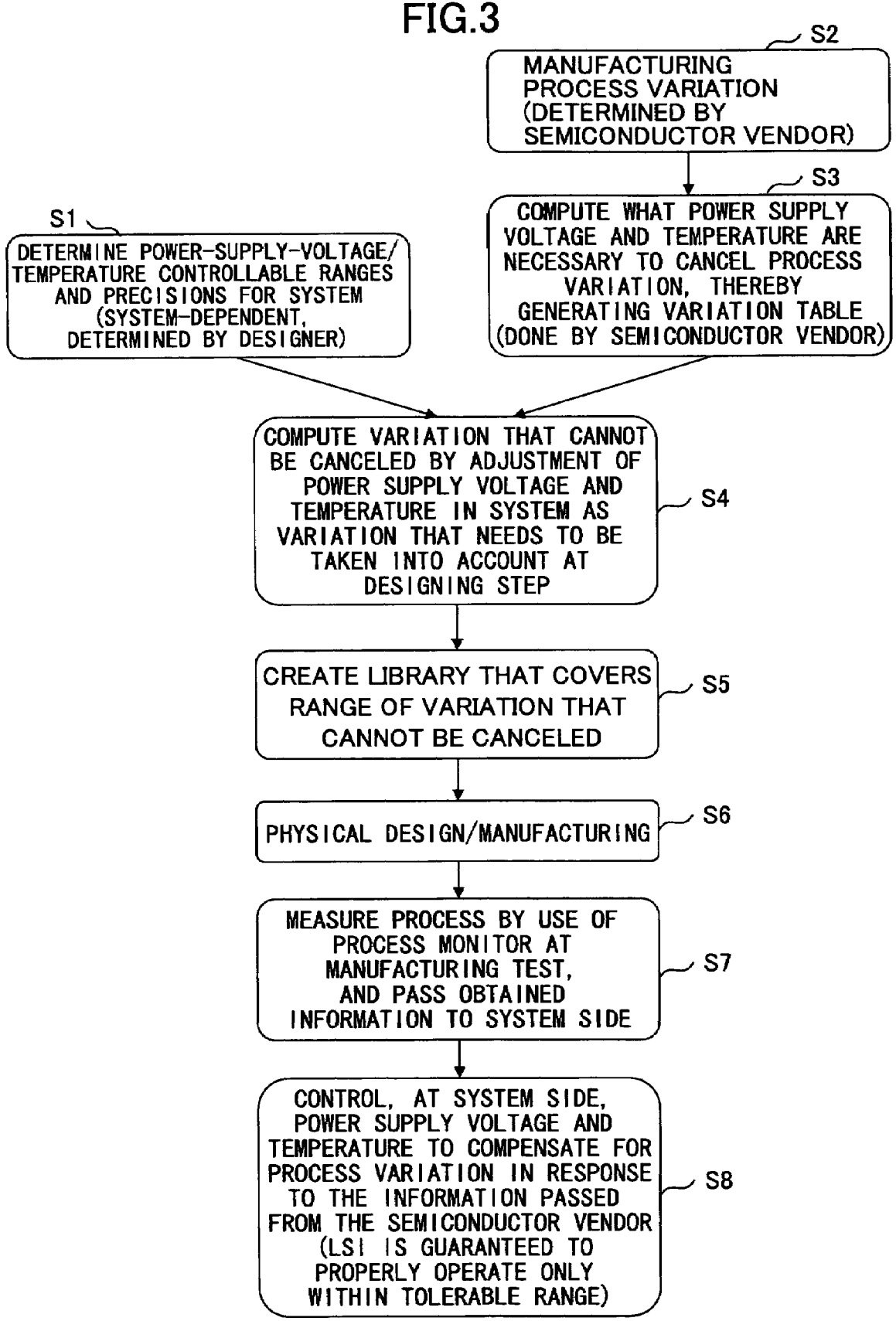

FIG.4A

| INPUT PARAMETER | | | OUTPUT PARAMETER (CENTER VALUE OF VARIATION) | | | | | | | | | | | | | | | |
|---|---|---|---|---|---|---|---|---|---|---|---|---|---|---|---|---|---|---|
| Pch (μA/μm) | Nch (μA/μm) | GATE CAPACITANCE (fF) | INTERCONNECTION RESISTANCE kΩ/mm | POWER SUPPLY VOLTAGE (AS RATIO TO REFERENCE VOLTAGE) WITH RESPECT TO Tj SERVING AS REFERENCE | | | | | | | | | | | | | | |
| | | | | -40°C | -30°C | -20°C | -10°C | 0°C | 10°C | 20°C | 30°C | 40°C | 50°C | 60°C | 70°C | 80°C | 90°C | 100°C | 110°C | 120°C |
| 585~630 | 260~280 | 3~4 | 0.7~0.9 | -10% | -10% | -10% | -10% | -10% | -9% | -9% | -9% | -9% | -9% | -8% | -8% | -8% | -8% | -8% | -7% | -7% |
| | | | 0.9~1.1 | -10% | -10% | -10% | -9% | -9% | -9% | -9% | -9% | -8% | -8% | -8% | -8% | -8% | -7% | -7% | -7% | -7% |
| | | | 1.1~1.3 | -10% | -10% | -10% | -9% | -9% | -9% | -9% | -8% | -8% | -8% | -8% | -8% | -7% | -7% | -7% | -7% | -7% |
| | | 4~6 | 0.7~0.9 | -10% | -10% | -9% | -9% | -9% | -9% | -8% | -8% | -8% | -8% | -7% | -7% | -7% | -7% | -7% | -6% | -6% |
| | | | 0.9~1.1 | -10% | -9% | -9% | -9% | -9% | -8% | -8% | -8% | -8% | -7% | -7% | -7% | -7% | -7% | -6% | -6% | -6% |
| | | | 1.1~1.3 | -9% | -9% | -9% | -9% | -8% | -8% | -8% | -8% | -7% | -7% | -7% | -7% | -7% | -6% | -6% | -6% | -6% |
| | | 6~8 | 0.7~0.9 | -9% | -9% | -9% | -8% | -8% | -8% | -8% | -7% | -7% | -7% | -7% | -7% | -6% | -6% | -6% | -6% | -6% |
| | | | 0.9~1.1 | -9% | -9% | -8% | -8% | -8% | -8% | -7% | -7% | -7% | -7% | -7% | -6% | -6% | -6% | -6% | -6% | -5% |
| | | | 1.1~1.3 | -8% | -8% | -8% | -8% | -8% | -7% | -7% | -7% | -7% | -7% | -6% | -6% | -6% | -6% | -6% | -5% | -5% |
| | 240~260 | 3~4 | 0.7~0.9 | -9% | -8% | -8% | -7% | -7% | -7% | -7% | -7% | -6% | -6% | -6% | -6% | -6% | -5% | -5% | -5% | -5% |
| | | | 0.9~1.1 | -8% | -8% | -7% | -7% | -7% | -7% | -7% | -6% | -6% | -6% | -6% | -6% | -5% | -5% | -5% | -5% | -5% |
| | | | 1.1~1.3 | -8% | -7% | -7% | -7% | -7% | -7% | -6% | -6% | -6% | -6% | -6% | -5% | -5% | -5% | -5% | -5% | -4% |
| | | 4~6 | 0.7~0.9 | -7% | -7% | -7% | -7% | -6% | -6% | -6% | -6% | -6% | -5% | -5% | -5% | -5% | -5% | -4% | -4% | -4% |
| | | | 0.9~1.1 | -7% | -7% | -7% | -6% | -6% | -6% | -6% | -5% | -5% | -5% | -5% | -5% | -5% | -4% | -4% | -4% | -4% |
| | | | 1.1~1.3 | -7% | -7% | -6% | -6% | -6% | -6% | -5% | -5% | -5% | -5% | -5% | -5% | -4% | -4% | -4% | -4% | -4% |
| | | 6~8 | 0.7~0.9 | -7% | -6% | -6% | -6% | -6% | -5% | -5% | -5% | -5% | -5% | -4% | -4% | -4% | -4% | -4% | -4% | -4% |
| | | | 0.9~1.1 | -6% | -6% | -6% | -6% | -5% | -5% | -5% | -5% | -5% | -4% | -4% | -4% | -4% | -4% | -4% | -4% | -3% |
| | | | 1.1~1.3 | -6% | -6% | -6% | -5% | -5% | -5% | -5% | -5% | -4% | -4% | -4% | -4% | -4% | -4% | -4% | -3% | -3% |
| | 220~240 | 3~4 | 0.7~0.9 | -6% | -6% | -5% | -5% | -5% | -5% | -5% | -4% | -4% | -4% | -4% | -4% | -4% | -3% | -3% | -3% | -3% |
| | | | 0.9~1.1 | -6% | -5% | -5% | -5% | -5% | -5% | -4% | -4% | -4% | -4% | -4% | -4% | -3% | -3% | -3% | -3% | -3% |
| | | | 1.1~1.3 | -5% | -5% | -5% | -5% | -5% | -4% | -4% | -4% | -4% | -4% | -4% | -3% | -3% | -3% | -3% | -3% | -3% |
| | | 4~6 | 0.7~0.9 | -5% | -5% | -5% | -5% | -4% | -4% | -4% | -4% | -4% | -4% | -3% | -3% | -3% | -3% | -3% | -3% | -3% |
| | | | 0.9~1.1 | | | | | | | | | | | | | | | | | |
| | | | 1.1~1.3 | | | | | | | | | | | | | | | | | |
| | | 6~8 | 0.7~0.9 | | | | | | | | | | | | | | | | | |
| | | | 0.9~1.1 | | | | | | | | | | | | | | | | | |
| | | | 1.1~1.3 | | | | | | | | | | | | | | | | | |

FIG.4B

| INPUT PARAMETER | | | OUTPUT PARAMETER (CENTER VALUE OF VARIATION) POWER SUPPLY VOLTAGE (AS RATIO TO REFERENCE VOLTAGE) WITH RESPECT TO Tj SERVING AS REFERENCE | | | | | | | | | | | | | | | | |
|---|---|---|---|---|---|---|---|---|---|---|---|---|---|---|---|---|---|---|---|
| Pch (μA/μm) | Nch (μA/μm) | GATE CAPACI-TANCE (fF) | INTERCONNECTION RESISTANCE kΩ/mm | -40°C | -30°C | -20°C | -10°C | 0°C | 10°C | 20°C | 30°C | 40°C | 50°C | 60°C | 70°C | 80°C | 90°C | 100°C | 110°C | 120°C |
| 495~540 | 260~280 | 3~4 | 0.7~0.9 | -7% | -7% | -6% | -6% | -6% | -6% | -6% | -5% | -5% | -5% | -5% | -5% | -4% | -4% | -4% | -4% | -4% |
| | | | 0.9~1.1 | -7% | -6% | -6% | -6% | -6% | -6% | -5% | -5% | -5% | -5% | -5% | -4% | -4% | -4% | -4% | -4% | -4% |
| | | | 1.1~1.3 | -6% | -6% | -6% | -6% | -6% | -5% | -5% | -5% | -5% | -5% | -4% | -4% | -4% | -4% | -4% | -3% | -3% |
| | | 4~6 | 0.7~0.9 | -6% | -6% | -6% | -5% | -5% | -5% | -5% | -5% | -4% | -4% | -4% | -4% | -4% | -4% | -3% | -3% | -3% |
| | | | 0.9~1.1 | -6% | -6% | -5% | -5% | -5% | -5% | -5% | -4% | -4% | -4% | -4% | -4% | -4% | -3% | -3% | -3% | -3% |
| | | | 1.1~1.3 | -6% | -5% | -5% | -5% | -5% | -5% | -4% | -4% | -4% | -4% | -4% | -3% | -3% | -3% | -3% | -3% | -3% |
| | | 6~8 | 0.7~0.9 | -5% | -5% | -5% | -5% | -5% | -4% | -4% | -4% | -4% | -4% | -3% | -3% | -3% | -3% | -3% | -3% | -2% |
| | | | 0.9~1.1 | -5% | -5% | -5% | -5% | -4% | -4% | -4% | -4% | -4% | -3% | -3% | -3% | -3% | -3% | -3% | -2% | -2% |
| | | | 1.1~1.3 | -5% | -5% | -5% | -4% | -4% | -4% | -4% | -4% | -3% | -3% | -3% | -3% | -3% | -3% | -2% | -2% | -2% |
| | 240~260 | 3~4 | 0.7~0.9 | -4% | -4% | -4% | -4% | -4% | -4% | -3% | -3% | -3% | -3% | -3% | -3% | -3% | -2% | -2% | -2% | -2% |
| | | | 0.9~1.1 | -4% | -4% | -4% | -4% | -4% | -3% | -3% | -3% | -3% | -3% | -3% | -3% | -2% | -2% | -2% | -2% | -2% |
| | | | 1.1~1.3 | -4% | -4% | -4% | -4% | -3% | -3% | -3% | -3% | -3% | -3% | -3% | -2% | -2% | -2% | -2% | -2% | -2% |
| | | 4~6 | 0.7~0.9 | -4% | -3% | -3% | -3% | -3% | -3% | -3% | -3% | -3% | -2% | -2% | -2% | -2% | -2% | -2% | -2% | -1% |
| | | | 0.9~1.1 | -3% | -3% | -3% | -3% | -3% | -3% | -3% | -3% | -2% | -2% | -2% | -2% | -2% | -2% | -2% | -1% | -1% |
| | | | 1.1~1.3 | -3% | -3% | -3% | -3% | -3% | -3% | -3% | -2% | -2% | -2% | -2% | -2% | -2% | -2% | -1% | -1% | -1% |
| | | 6~8 | 0.7~0.9 | -3% | -3% | -3% | -3% | -2% | -2% | -2% | -2% | -2% | -2% | -2% | -2% | -1% | -1% | -1% | -1% | -1% |
| | 220~240 | 3~4 | 0.7~0.9 | -3% | -3% | -2% | -2% | -2% | -2% | -2% | -2% | -2% | -2% | -2% | -1% | -1% | -1% | -1% | -1% | -1% |
| | | | 0.9~1.1 | -3% | -2% | -2% | -2% | -2% | -2% | -2% | -2% | -2% | -1% | -1% | -1% | -1% | -1% | -1% | -1% | -1% |
| | | | 1.1~1.3 | -2% | -2% | -2% | -2% | -2% | -2% | -2% | -2% | -1% | -1% | -1% | -1% | -1% | -1% | -1% | -1% | -1% |
| | | 4~6 | 0.7~0.9 | -2% | -2% | -2% | -2% | -2% | -2% | -1% | -1% | -1% | -1% | -1% | -1% | -1% | -1% | -1% | -1% | 0% |
| | | | 0.9~1.1 | -2% | -2% | -2% | -2% | -2% | -1% | -1% | -1% | -1% | -1% | -1% | -1% | -1% | -1% | -1% | 0% | 0% |
| | | | 1.1~1.3 | -2% | -2% | -2% | -1% | -1% | -1% | -1% | -1% | -1% | -1% | -1% | -1% | -1% | 0% | 0% | 0% | 0% |
| | | 6~8 | 0.7~0.9 | -2% | -1% | -1% | -1% | -1% | -1% | -1% | -1% | -1% | -1% | -1% | -1% | 0% | 0% | 0% | 0% | 0% |
| | 200~220 | 3~4 | 0.7~0.9 | -1% | -1% | -1% | -1% | -1% | -1% | -1% | -1% | -1% | -1% | -1% | 0% | 0% | 0% | 0% | 0% | 0% |
| | | | 0.9~1.1 | -1% | -1% | -1% | -1% | -1% | -1% | -1% | -1% | -1% | -1% | 0% | 0% | 0% | 0% | 0% | 0% | 0% |
| | | | 1.1~1.3 | -1% | -1% | -1% | -1% | -1% | -1% | -1% | -1% | -1% | 0% | 0% | 0% | 0% | 0% | 0% | 0% | 1% |
| | | 4~6 | 0.7~0.9 | -1% | -1% | -1% | -1% | -1% | -1% | -1% | 0% | 0% | 0% | 0% | 0% | 0% | 0% | 0% | 1% | 1% |
| | | | 0.9~1.1 | -1% | -1% | -1% | 0% | 0% | 0% | 0% | 0% | 0% | 0% | 0% | 0% | 0% | 1% | 1% | 1% | 1% |
| | | | 1.1~1.3 | 0% | 0% | 0% | 0% | 0% | 0% | 0% | 0% | 0% | 0% | 0% | 1% | 1% | 1% | 1% | 1% | 1% |
| | | 6~8 | 0.7~0.9 | 0% | 0% | 0% | 0% | 0% | 0% | 0% | 0% | 1% | 1% | 1% | 1% | 1% | 1% | 1% | 1% | 1% |
| | 180~200 | 3~4 | 0.7~0.9 | 0% | 0% | 0% | 0% | 0% | 0% | 1% | 1% | 1% | 1% | 1% | 1% | 1% | 1% | 1% | 1% | 1% |
| | | | 0.9~1.1 | 0% | 0% | 0% | 0% | 1% | 1% | 1% | 1% | 1% | 1% | 1% | 1% | 1% | 1% | 1% | 1% | 2% |
| | | | 1.1~1.3 | 0% | 0% | 1% | 1% | 1% | 1% | 1% | 1% | 1% | 1% | 1% | 1% | 1% | 1% | 2% | 2% | 2% |
| | | 4~6 | 0.7~0.9 | 1% | 1% | 1% | 1% | 1% | 1% | 1% | 1% | 1% | 1% | 1% | 1% | 1% | 2% | 2% | 2% | 2% |
| | | | 0.9~1.1 | 1% | 1% | 1% | 1% | 1% | 1% | 1% | 1% | 1% | 1% | 1% | 1% | 2% | 2% | 2% | 2% | 2% |
| | | 6~8 | 0.7~0.9 | 1% | 1% | 1% | 1% | 1% | 1% | 1% | 1% | 1% | 1% | 2% | 2% | 2% | 2% | 2% | 2% | 2% |

OUTPUT PARAMETER (CENTER VALUE OF VARIATION) — POWER SUPPLY VOLTAGE (AS RATIO TO REFERENCE VOLTAGE) WITH RESPECT TO Tj SERVING AS REFERENCE

| Pch (μA/μm) | Nch (μA/μm) | Gate Capacitance (fF) | Interconnection Resistance (kΩ/mm) | -40°C | -30°C | -20°C | -10°C | 0°C | 10°C | 20°C | 30°C | 40°C | 50°C | 60°C | 70°C | 80°C | 90°C | 100°C | 110°C | 120°C |
|---|---|---|---|---|---|---|---|---|---|---|---|---|---|---|---|---|---|---|---|---|
| 360~405 | 200~220 | 3~4 | 0.7~0.9 | 1% | 1% | 2% | 2% | 2% | 2% | 2% | 2% | 2% | 2% | 2% | 3% | 3% | 3% | 3% | 3% | 3% |
| | | | 0.9~1.1 | 1% | 1% | 2% | 2% | 2% | 2% | 2% | 2% | 2% | 2% | 3% | 3% | 3% | 3% | 3% | 3% | 3% |
| | | | 1.1~1.3 | 1% | 2% | 2% | 2% | 2% | 2% | 2% | 2% | 3% | 3% | 3% | 3% | 3% | 3% | 3% | 3% | 3% |
| | | 4~6 | 0.7~0.9 | 2% | 2% | 2% | 2% | 2% | 2% | 2% | 2% | 3% | 3% | 3% | 3% | 3% | 3% | 3% | 3% | 4% |
| | | | 0.9~1.1 | 2% | 2% | 2% | 2% | 2% | 3% | 3% | 3% | 3% | 3% | 3% | 3% | 3% | 3% | 3% | 4% | 4% |
| | | | 1.1~1.3 | 2% | 2% | 2% | 2% | 3% | 3% | 3% | 3% | 3% | 3% | 3% | 3% | 4% | 4% | 4% | 4% | 4% |
| | | 6~8 | 0.7~0.9 | 2% | 2% | 2% | 3% | 3% | 3% | 3% | 3% | 3% | 3% | 3% | 4% | 4% | 4% | 4% | 4% | 4% |
| | | | 0.9~1.1 | 2% | 3% | 3% | 3% | 3% | 3% | 3% | 3% | 3% | 4% | 4% | 4% | 4% | 4% | 4% | 4% | 4% |
| | | | 1.1~1.3 | 2% | 3% | 3% | 3% | 3% | 3% | 3% | 3% | 4% | 4% | 4% | 4% | 4% | 4% | 4% | 4% | 4% |
| | 180~200 | 3~4 | 0.7~0.9 | 2% | 3% | 3% | 3% | 3% | 3% | 3% | 4% | 4% | 4% | 4% | 4% | 4% | 4% | 4% | 4% | 4% |
| | | | 0.9~1.1 | 3% | 3% | 3% | 3% | 3% | 4% | 4% | 4% | 4% | 4% | 4% | 4% | 4% | 4% | 4% | 4% | 5% |
| | | | 1.1~1.3 | 3% | 3% | 3% | 4% | 4% | 4% | 4% | 4% | 4% | 4% | 4% | 4% | 5% | 5% | 5% | 5% | 5% |
| | | 4~6 | 0.7~0.9 | 3% | 3% | 4% | 4% | 4% | 4% | 4% | 4% | 4% | 4% | 4% | 5% | 5% | 5% | 5% | 5% | 5% |
| | | | 0.9~1.1 | 3% | 4% | 4% | 4% | 4% | 4% | 4% | 4% | 4% | 5% | 5% | 5% | 5% | 5% | 5% | 5% | 5% |
| | | | 1.1~1.3 | 3% | 4% | 4% | 4% | 4% | 4% | 4% | 5% | 5% | 5% | 5% | 5% | 5% | 5% | 5% | 5% | 5% |
| | | 6~8 | 0.7~0.9 | 4% | 4% | 4% | 4% | 4% | 5% | 5% | 5% | 5% | 5% | 5% | 5% | 5% | 5% | 5% | 5% | 6% |
| | | | 0.9~1.1 | 4% | 4% | 5% | 5% | 5% | 5% | 5% | 5% | 5% | 5% | 5% | 5% | 6% | 6% | 6% | 6% | 6% |
| | | | 1.1~1.3 | 4% | 4% | 5% | 5% | 5% | 5% | 5% | 5% | 5% | 5% | 5% | 6% | 6% | 6% | 6% | 6% | 6% |
| | 160~180 | 3~4 | 0.7~0.9 | 5% | 5% | 5% | 5% | 5% | 5% | 5% | 5% | 6% | 6% | 6% | 6% | 6% | 6% | 6% | 6% | 6% |
| | | | 0.9~1.1 | 5% | 5% | 5% | 6% | 6% | 6% | 6% | 6% | 6% | 6% | 6% | 6% | 6% | 6% | 6% | 7% | 7% |
| | | | 1.1~1.3 | 5% | 5% | 6% | 6% | 6% | 6% | 6% | 6% | 6% | 6% | 6% | 6% | 7% | 7% | 7% | 7% | 7% |
| | | 4~6 | 0.7~0.9 | 5% | 6% | 6% | 6% | 6% | 6% | 6% | 6% | 6% | 6% | 7% | 7% | 7% | 7% | 7% | 7% | 7% |
| | | | 0.9~1.1 | 5% | 6% | 6% | 6% | 6% | 6% | 7% | 7% | 7% | 7% | 7% | 7% | 7% | 7% | 7% | 7% | 7% |
| | | | 1.1~1.3 | 6% | 6% | 6% | 7% | 7% | 7% | 7% | 7% | 7% | 7% | 7% | 7% | 7% | 7% | 7% | 7% | 7% |
| | | 6~8 | 0.7~0.9 | 6% | 6% | 6% | 7% | 7% | 7% | 7% | 7% | 7% | 7% | 7% | 7% | 7% | 7% | 7% | 8% | 8% |
| | | | 0.9~1.1 | 6% | 6% | 7% | 7% | 7% | 7% | 7% | 7% | 7% | 7% | 8% | 8% | 8% | 8% | 8% | 8% | 8% |
| | | | 1.1~1.3 | 6% | 6% | 7% | 7% | 7% | 7% | 7% | 7% | 7% | 8% | 8% | 8% | 8% | 8% | 8% | 8% | 8% |
| | 140~160 | 3~4 | 0.7~0.9 | 6% | 6% | 7% | 7% | 7% | 7% | 7% | 7% | 8% | 8% | 8% | 8% | 8% | 8% | 8% | 8% | 8% |
| | | | 0.9~1.1 | 6% | 7% | 7% | 7% | 7% | 7% | 7% | 8% | 8% | 8% | 8% | 8% | 8% | 8% | 8% | 8% | 9% |
| | | | 1.1~1.3 | 6% | 7% | 7% | 7% | 7% | 7% | 8% | 8% | 8% | 8% | 8% | 8% | 8% | 8% | 9% | 9% | 9% |

FIG.4F

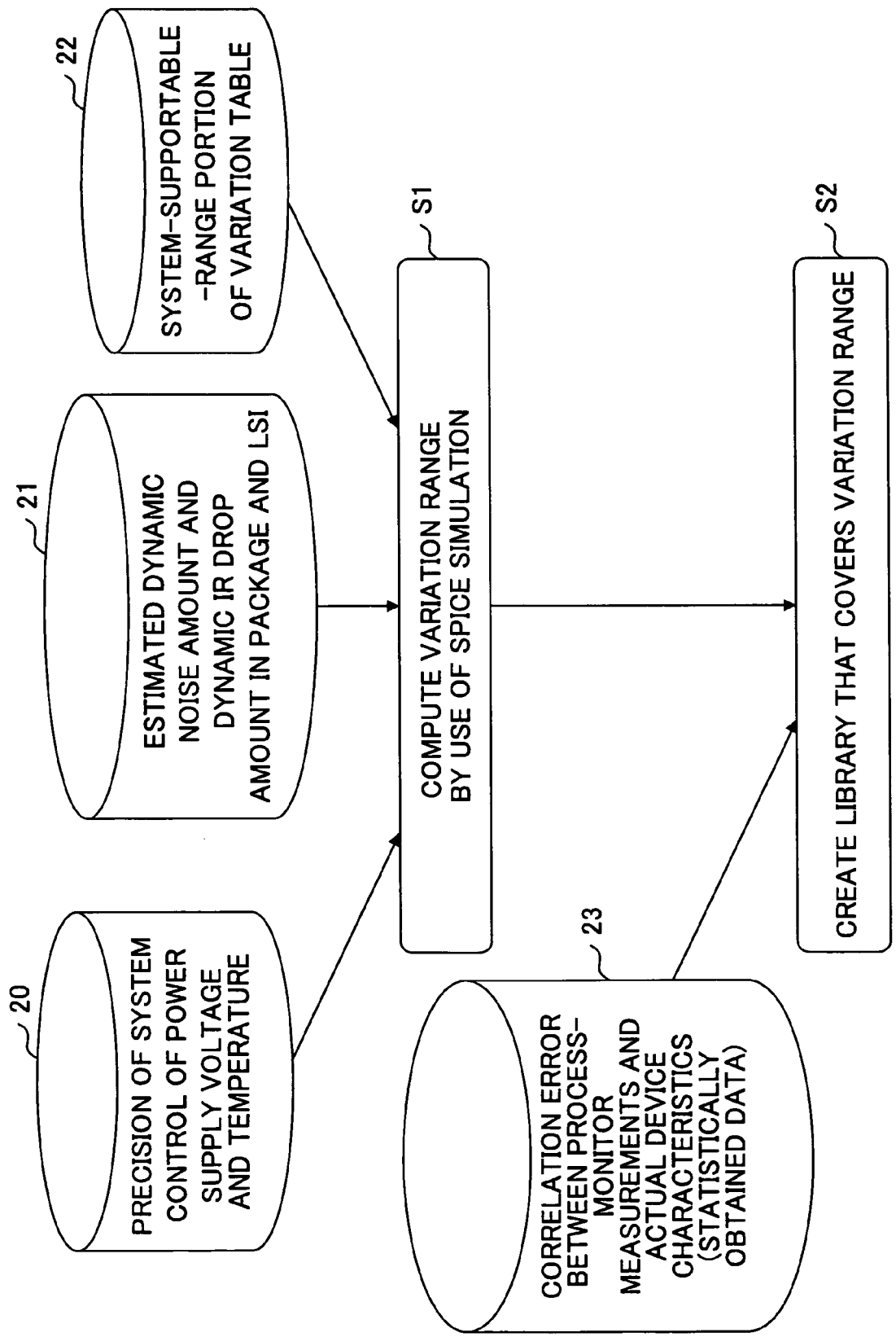

FIG.6

| PROCESS MONITOR MEASUREMENTS | | | | | | RANK INFORMATION TO BE PASSED TO SYSTEM SIDE |
|---|---|---|---|---|---|---|
| Pch(μA/μm) | | Nch(μA/μm) | | GATE CAPACITANCE (fF) | INTERCONNECTION RESISTANCE | |
| min | max | min | max | | | |
| 540 | 630 | 240 | 280 | 3 | Any | A |
| 540 | 630 | 240 | 280 | 5 | Any | A |
| 540 | 630 | 240 | 280 | 8 | Any | A |
| 540 | 630 | 160 | 240 | 3 | Any | A |
| 540 | 630 | 160 | 240 | 5 | Any | B |
| 540 | 630 | 160 | 240 | 8 | Any | B |
| 360 | 540 | 240 | 280 | 3 | Any | A |
| 360 | 540 | 240 | 280 | 5 | Any | B |
| 360 | 540 | 240 | 280 | 8 | Any | B |
| 360 | 540 | 160 | 240 | 3 | Any | B |
| 360 | 540 | 160 | 240 | 5 | Any | B |
| 360 | 540 | 160 | 240 | 8 | Any | B |
| 270 | 360 | 160 | 240 | 3 | Any | C |
| 270 | 360 | 160 | 240 | 5 | Any | B |
| 270 | 360 | 160 | 240 | 8 | Any | C |
| 360 | 540 | 120 | 160 | 3 | Any | C |
| 360 | 540 | 120 | 160 | 5 | Any | C |
| 360 | 540 | 120 | 160 | 8 | Any | C |
| 270 | 360 | 120 | 160 | 3 | Any | C |
| 270 | 360 | 120 | 160 | 5 | Any | C |
| 270 | 360 | 120 | 160 | 8 | Any | C |

FIG.7A

| RANK INFORMATION TO BE PASSED TO SYSTEM SIDE | LOWEST VOLTAGE (V) | HIGHEST VOLTAGE (V) | LOWEST TEMPERATURE Tj (°C) | HIGHEST TEMPERATURE Tj (°C) |
|---|---|---|---|---|
| A | 1.10 | 1.20 | 25 | 75 |
| B | 1.15 | 1.25 | 25 | 75 |
| C | 1.20 | 1.30 | 25 | 75 |

FIG.7B

| RANK INFORMATION TO BE PASSED TO SYSTEM SIDE | LOWEST VOLTAGE (V) | HIGHEST VOLTAGE (V) | LOWEST TEMPERATURE Tj (°C) | HIGHEST TEMPERATURE Tj (°C) |
|---|---|---|---|---|
| A | 1.15 | 1.25 | 60 | 125 |
| B | 1.15 | 1.25 | 25 | 75 |
| C | 1.15 | 1.25 | −40 | 30 | ical ranges ranges, and manufacturing process variation.

DESIGNING AND OPERATING OF SEMICONDUCTOR INTEGRATED CIRCUIT BY TAKING INTO ACCOUNT PROCESS VARIATION

CROSS-REFERENCE TO RELATED APPLICATIONS

The present application is based upon and claims the benefit of priority from the prior Japanese Patent Application No. 2006-083336 filed on Mar. 24, 2006, with the Japanese Patent Office, the entire contents of which are incorporated herein by reference.

BACKGROUND OF THE INVENTION

1. Field of the Invention

The present invention generally relates to computer-aided design, and particularly relates to the designing of a semiconductor integrated circuit taking into account process variation.

2. Description of the Related Art

Variation that needs to be taken into account at the time of the operation of a semiconductor integrated circuit includes not only a process variation that is a variation in the characteristics of the semiconductor integrated circuit but also a power-supply-voltage variation and a temperature variation that are variations in the operating environment. In the designing of a semiconductor integrated circuit, timing check and layout modification are repeated as many time as necessary to provide a circuit design that does not have a timing failure. In such timing check, the power-supply-voltage variation, temperature variation, and process variation are all required to be taken into account.

To be specific, under the conditions that bring about a maximum delay within the tolerable power-supply-voltage range and the tolerable temperature range, a maximum-delay condition that further achieves a maximum delay time due to process variation is taken into account, and, also, under the conditions that bring about a minimum delay within the tolerable power-supply-voltage range and the tolerable temperature range, a minimum-delay condition that further achieves a minimum delay time due to process variation is taken into account, A check is then made as to whether both the delay time of the minimum-delay condition and the delay time of the maximum-delay condition satisfy predetermined delay time requirements. If the check finds that these requirements are not satisfied, the layout is modified through cell insertion, cell removal, cell replacement, cell displacement, and/or interconnection modification so as to resolve the error.

FIG. 1 is a flowchart showing a procedure from the designing of a semiconductor integrated circuit to the operating of the semiconductor integrated circuit after implementation.

At step S1, power-supply-voltage/temperature ranges are determined. The power-supply-voltage/temperature ranges are system-dependent, and are determined by a party that designs the system. At step S2, manufacturing process variation is determined. The manufacturing process variation is a range of process variation that is determined in advance by taking into account how much variation is expected during the manufacturing of the semiconductor integrated circuit, and is determined by a semiconductor vendor (i.e., the party that manufactures and provides the semiconductor integrated circuit).

At step S3, all the possible variations are computed. At step S4, libraries designed to cover all the ranges of variations are generated. These libraries define the cell size, gate-input capacitance, output-drive capability, delay time, and the like of each cell. With respect to each of the gate-input capacitance, the output-drive capability, the delay time, and the like, a maximum value and minimum value are defined by taking into account all the variations inclusive of the power-supply-voltage/temperature ranges and the manufacturing process variation.

At step S5, physical designing and manufacturing are performed. Namely, timing checks are performed by considering the variations by use of the libraries, thereby determining a physical layout, based on which the semiconductor integrated circuit is manufactured.

At step S6, a process is measured by use of a process monitor in the manufacturing test. A special circuit called "process monitor" is embedded at a predetermined position on the wafer. The characteristics of this circuit are checked to measure the process of the manufactured semiconductor integrated circuit. If the manufactured semiconductor integrated circuit has a manufacturing process that falls within the expected range, the circuit is treated as a proper product. If the process is not within the expected range of the manufacturing process variation, the circuit is rejected as unusable.

At step S7, the semiconductor integrated circuit is operated within the power-supply-voltage/temperature ranges that are determined at the beginning.

As the development of the semiconductor technology serves to further miniaturize semiconductor integrated circuits, the process variation of semiconductor integrated circuits tends to increase. When a total variation that includes a process variation, a power supply voltage variation, and a temperature variation is taken into consideration, the maximum delay of signal propagation in a semiconductor integrated circuit may possibly be several-times larger than the minimum delay. A current designing process first sets a tolerable power supply voltage range and tolerable temperature range, and the upper end and lower end of a total variation are derived by taking into account process variation in addition to these tolerable ranges, followed by designing a circuit that properly operates under all the conditions that fall within the derived range of variation. In order to design a semiconductor integrated circuit that properly operates in a such a large variation range in which the maximum delay may be several-times larger than the minimum delay, the designing process of a semiconductor integrated circuit becomes complex, and, also, the number of process steps increases, resulting in an increased amount of time and labor.

[Patent Document 1] Japanese Patent Application Publication No. 2002-353083

[Patent Document 2] Japanese Patent Application Publication No. 2002-324097

Accordingly, there is a need for a method of designing a semiconductor integrated circuit that can finish designing in a short time.

SUMMARY OF THE INVENTION

It is a general object of the present invention to provide a method of designing a semiconductor integrated circuit that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a method of designing a semiconductor integrated circuit particularly pointed out in the specification in such full, clear, concise, and exact terms as to enable a person having ordinary skill in the art to practice the invention.

To achieve these and other advantages in accordance with the purpose of the invention, the invention provides a method of designing a semiconductor integrated circuit, which includes defining a tolerable range in which an operating temperature and an operating power supply voltage of a semiconductor integrated circuit are allowed to vary, computing a target temperature and a target power supply voltage that cancel variation in circuit characteristics caused by process variation of the semiconductor integrated circuit, separately for each circuit characteristic responsive to the process variation, and designing the semiconductor integrated circuit such that the semiconductor integrated circuit properly operates with any temperature and power supply voltage within the tolerable range based on an assumption that the semiconductor integrated circuit is to operate within the tolerable range centered substantially at the target temperature and target power supply voltage.

According to another aspect of the present invention, an apparatus for designing a semiconductor integrated circuit includes a memory unit configured to store data and a program, and a processing unit configured to process the data stored in the memory by executing the program stored in the memory, wherein the processing unit performs defining a tolerable range in which an operating temperature and an operating power supply voltage of a semiconductor integrated circuit are allowed to vary, computing a target temperature and a target power supply voltage that cancel variation in circuit characteristics caused by process variation of the semiconductor integrated circuit, separately for each circuit characteristic responsive to the process variation, and designing the semiconductor integrated circuit such that the semiconductor integrated circuit properly operates with any temperature and power supply voltage within the tolerable range based on an assumption that the semiconductor integrated circuit is to operate within the tolerable range centered substantially at the target temperature and target power supply voltage.

According to another aspect of the present invention, a method of controlling an operation of a semiconductor integrated circuit includes acquiring a semiconductor integrated circuit, acquiring information indicative of a circuit characteristic responsive to process variation of the semiconductor integrated circuit, and operating the semiconductor integrated circuit with a temperature and power supply voltage responsive to the information.

According to another aspect of the present invention, a semiconductor integrated circuit characterized to contain electronic data regarding a circuit characteristic responsive to process variation such that the electronic data is readable from an exterior of the semiconductor integrated circuit.

According to another aspect of the present invention, a system for controlling a semiconductor integrated circuit includes a temperature measuring unit configured to measure a temperature of a semiconductor integrated circuit, a temperature controlling unit configured to control the temperature of the semiconductor integrated circuit in response to a temperature measurement by the temperature measuring unit, and a voltage controlling unit configured to control a power supply voltage supplied to the semiconductor integrated circuit, wherein the semiconductor integrated circuit is operated with a temperature and power supply voltage responsive to information indicative of a circuit characteristic responsive to process variation of the semiconductor integrated circuit.

According to at least one embodiment of the present invention, it suffices for the semiconductor vendor to design a circuit such that the semiconductor integrated circuit properly operates with any temperature and power supply voltage within the tolerable range based on the assumption that the semiconductor integrated circuit will be used to operate within the tolerable range centered substantially at the target temperature and target power supply voltage. While the system user is required to provide the target temperature and target power supply voltage with a predetermined level of accuracy, the load on the semiconductor vendor is reduced, thereby significantly reducing the time and labor spent on designing the semiconductor integrated circuit.

BRIEF DESCRIPTION OF THE DRAWINGS

Other objects and further features of the present invention will be apparent from the following detailed description when read in conjunction with the accompanying drawings, in which:

FIG. 1 is a flowchart showing a procedure from the designing of a semiconductor integrated circuit to the operating of the semiconductor integrated circuit after implementation;

FIG. 3 is a flowchart showing a procedure from the designing of a semiconductor integrated circuit to the operating of the semiconductor integrated circuit after implementation according to the present invention;

FIG. 4A is a drawing showing an example of a variation table;

FIG. 4B is a drawing showing an example of a variation table;

FIG. 4C is a drawing showing an example of a variation table;

FIG. 4D is a drawing showing an example of a variation table;

FIG. 4E is a drawing showing an example of a variation table;

FIG. 4F is a drawing showing an example of a variation table;

FIG. 5 is a flowchart for explaining the detail of the library generating step shown at step S5 of FIG. 3;

FIG. 6 is a drawing for explaining information that is passed to the system designer;

FIGS. 7A and 7B are drawings illustrating correspondence tables that show correspondences between ranks, power supply voltages, and temperatures. Such a correspondence table is passed to the systems side together with the rank information;

DESCRIPTION OF THE PREFERRED EMBODIMENTS

In the following, embodiments of the present invention will be described with reference to the accompanying drawings.

Figure 2B:
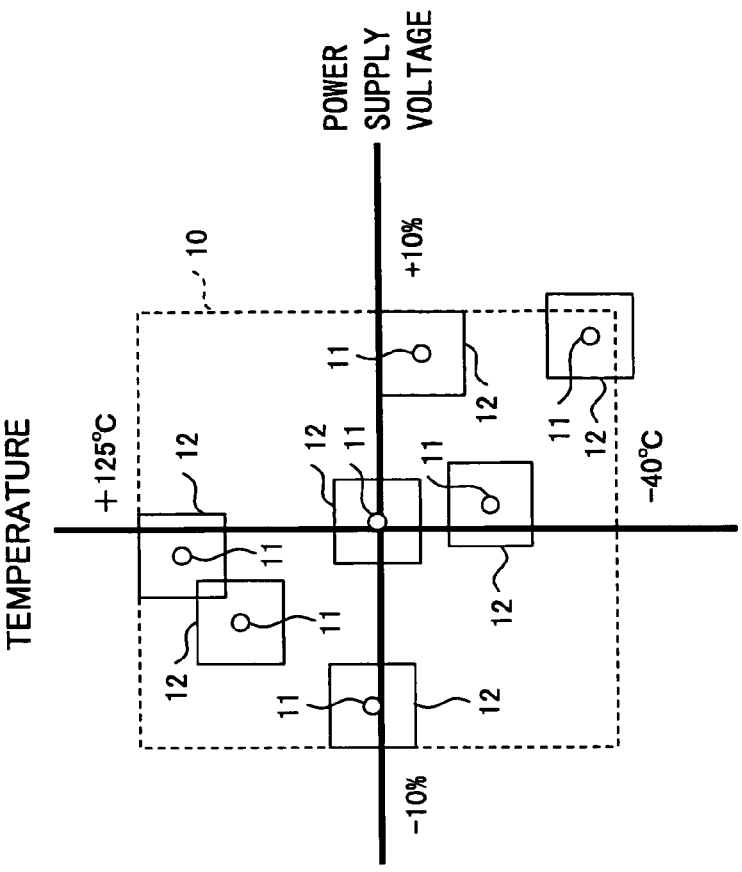
FIGS. 2A and 2B are drawings for explaining the method of designing a semiconductor integrated circuit according to the present invention as compared with a related-art method of designing a semiconductor integrated circuit.
Figure 2A:
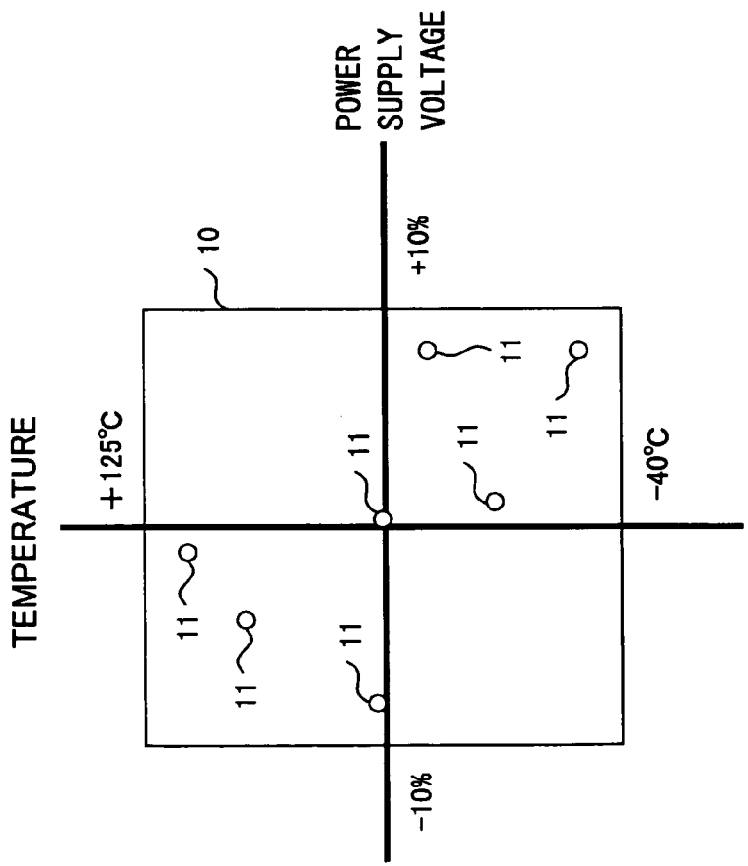

FIGS. 2A and 2B are drawings for explaining the method of designing a semiconductor integrated circuit according to the present invention as compared with a related-art method of designing a semiconductor integrated circuit. FIG. 2A illustrates the schematic representation of the related-art method of designing a semiconductor integrated circuit. The horizontal axis represents a power-supply-voltage variation range, and the vertical axis represents a temperature variation range. The system designer may specify a temperature range of −40 degrees Celsius to +125 degrees Celsius, and a power-supply-voltage range of −10% to +10% (as a ratio to the reference power supply voltage) as tolerable system ranges, for example. In such a case, a semiconductor integrated circuit is required that properly operates under all the temperature conditions and all the power-supply-voltage conditions within a frame 10 shown in FIG. 2A. Points 11 shown in FIG. 2A indicate the circuit characteristics that fluctuate due to process variation. Seven points 11 are illustrated in FIG. 2A, for example. When seven semiconductor integrated circuits are manufactured, the power supply voltage and temperature that achieves a typical operating condition (i.e., a delay condition that is in the middle between the maximum delay condition and the minimum delay condition) under the corresponding process variation is indicated by the coordinate position of each of the points 11.

Since each semiconductor integrated circuit needs to properly operate under all the temperature conditions and all the power supply voltage conditions within the frame 10, the semiconductor vendor needs to design the semiconductor integrated circuit such that all the possible semiconductor integrated circuits corresponding to the respective points 11 properly operate under all the temperature conditions and all the power supply voltage conditions within the frame 10. In order to achieve this, the timing check and layout modification of the semiconductor integrated circuit require a large amount of time and labor.

FIG. 2B illustrates the schematic representation of the method of designing a semiconductor integrated circuit according to the present invention. The horizontal axis represents a power-supply-voltage variation range, and the vertical axis represents a temperature variation range. In the present invention, it is assumed that the system designer can set the power supply voltage and temperature of a semiconductor integrated circuit to a specified power supply voltage and temperature within a predetermined power supply voltage range and predetermined temperature range, with the adjustment of the power supply voltage and temperature being permitted to include an error within a tolerable range. Namely, at the time of system operation, the system designer (user) is required to operate the semiconductor integrated circuit within the tolerable range centered at the specified power supply voltage and temperature.

In the related-art configuration, the semiconductor integrated circuit is required to properly operate under all the conditions falling within a temperature range of −40 degrees Celsius to +125 degrees Celsius and a power-supply-voltage range of −10% to +10%, for example, so that heavy load is imposed on the semiconductor vendor. In the present invention, the system user is required to provide a specified temperature and power supply voltage with predetermined precision within a temperature range of −40 degrees Celsius to +125 degrees Celsius and a power-supply-voltage range of −10% to +10%, for example. This reduces the load on the semiconductor vendor, thereby significantly reducing the time and labor spent on designing a semiconductor integrated circuit.

In FIG. 2B, frames 12 shown around the points 11 corresponding to the circuit characteristics responsive to process variation represent the tolerable range (precision) of a temperature and power supply voltage that are set by the system user. When a semiconductor integrated circuit corresponding to a given point 11 is to be used in a system, the system designer (user) is notified of parameters indicative of process variation of the semiconductor integrated circuit (i.e., parameters indicative of the circuit characteristics). Namely, the coordinates (i.e., power supply voltage and temperature) of the point 11 corresponding to the semiconductor integrated circuit are provided as data. The system designer operates the semiconductor integrated circuit by use of the specified power supply voltage and temperature. Since an error within the tolerable range is permitted for the setting of the power supply voltage and temperature, the power supply voltage and temperature end up having some variation. This variation is shown as the frames 12.

In the related-art configuration shown in FIG. 2A, the semiconductor vendor must design a semiconductor integrated circuit such that all the possible semiconductor integrated circuits corresponding to the respective points 11 properly operate under all the temperature conditions and all the power supply voltage conditions within the frame 10. In the present invention shown in FIG. 2B, it suffices for the semiconductor vendor to design a semiconductor integrated circuit such that all the possible semiconductor integrated circuits corresponding to the respective points 11 properly operate under all the temperature conditions and all the power supply voltage conditions within the frame 12 defined around the points 11. Namely, the size of variation that needs to be taken into account with respect to temperature and power supply voltage is significantly smaller than that of the related-art configuration.

FIG. 3 is a flowchart showing a procedure from the designing of a semiconductor integrated circuit to the operating of the semiconductor integrated circuit after implementation according to the present invention.

At step S1, power-supply-voltage/temperature controllable ranges and precisions are determined for the system. The power-supply-voltage/temperature controllable ranges and precision are system-dependent, and are determined by a party that designs the system. At step S2, manufacturing process variation is determined. The manufacturing process variation is a range of process variation that is determined in advance by taking into account how much variation is expected during the manufacturing of the semiconductor integrated circuit, and is determined by a semiconductor vendor (i.e., the party that manufactures and provides the semiconductor integrated circuit).

At step S3, what power supply voltage and temperature are necessary to cancel process variation are computed, thereby generating a variation table. Namely, the temperature and power supply voltage that cancel the fluctuation of the circuit characteristics due to the process variation of the semiconductor integrated circuit are computed separately for each circuit characteristic responsive to process variation. Specifically, the power supply voltage and temperature that are needed to achieve an operation of a typical condition are obtained separately for each circuit characteristic responsive to process variation. The obtained power supply voltages and temperatures are stored such as to be paired with the respective circuit characteristics responsive to process variation, thereby generating data in a table format. The power supply voltage and temperature obtained separately for each circuit characteristic responsive to process variation correspond to the coordinates of a corresponding point 11 shown in FIG. 2B.

At step S4, the variation that cannot be canceled by the adjustment of a power supply voltage and temperature in the system is computed as a variation that needs to be taken into account at the designing step. That is, when a semiconductor integrated circuit corresponding to a given point 11 as shown in FIG. 2B operates in the system, the power supply voltage and temperature suffice to be set at any position as long as they are within the frame 12 corresponding to the predetermined tolerable range centered at the given point 11. The extension of the frame 12 corresponds to the variation that needs to be taken into account at the designing process.

At step S5, libraries designed to cover the range of the variation that cannot be canceled are generated. These libraries define the cell size, gate-input capacitance, output-drive capability, delay time, and the like of each cell. With respect to each of the gate-input capacitance, the output-drive capability, the delay time, and the like, a maximum value and minimum value are defined by taking into account all the variations inclusive of the power-supply-voltage/temperature ranges and the manufacturing process variation.

At step S6, physical designing and manufacturing are performed. Namely, timing checks are performed by considering the variations by use of the libraries, thereby determining a physical layout, based on which the semiconductor integrated circuit is manufactured.

At step S7, a process is measured by use of a process monitor in the manufacturing test, and information indicative of the measured process is passed to the system designer (user). A special circuit called "process monitor" is embedded at a predetermined position on the wafer. The characteristics of this circuit are checked to measure the process of the manufactured semiconductor integrated circuit. If the manufactured semiconductor integrated circuit has a manufacturing process that falls within the expected range, the circuit is treated as a proper product. If the process is not within the expected range of the manufacturing process variation, the circuit is rejected as unusable.

At step S8, the system side controls the power supply voltage and temperature to compensate for process variation in response to the information passed from the semiconductor vendor. The semiconductor integrated circuit provided from the semiconductor vendor is guaranteed to properly operate only within the tolerable range around the power supply voltage and temperature specified by the information provided from the semiconductor vendor.

FIGS. 4A through 4F are drawings showing an example of a variation table. The variation table is a table that is generated at step S3 of FIG. 3. As previously described, the power supply voltage and temperature that are needed to achieve an operation of a typical condition are obtained separately for each circuit characteristic responsive to process variation. The obtained power supply voltages and temperatures are stored such as to be paired with the respective circuit characteristics responsive to process variation, thereby generating data in a table format, which is a variation table.

FIGS. 4A through 4F illustrate respective portions of a single, large variation table, and together constitute the variation table. Input parameters include the amount of an electric current per unit width of a P-channel transistor, the amount of an electric current per unit width of an N-channel transistor, a gate capacitance of a transistor, and a resistance per unit length of an interconnection.

Figure 4C:
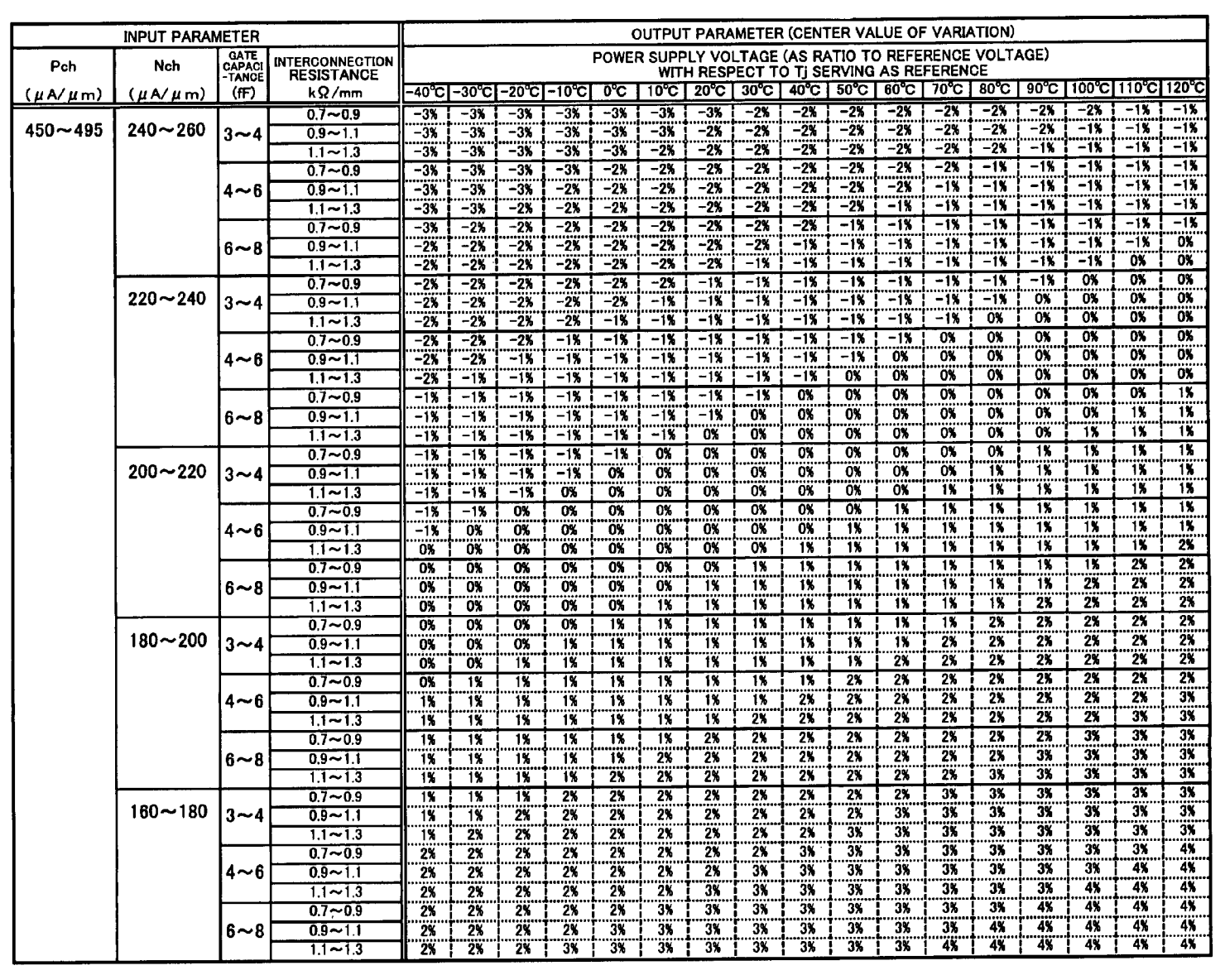
Figure 4D:
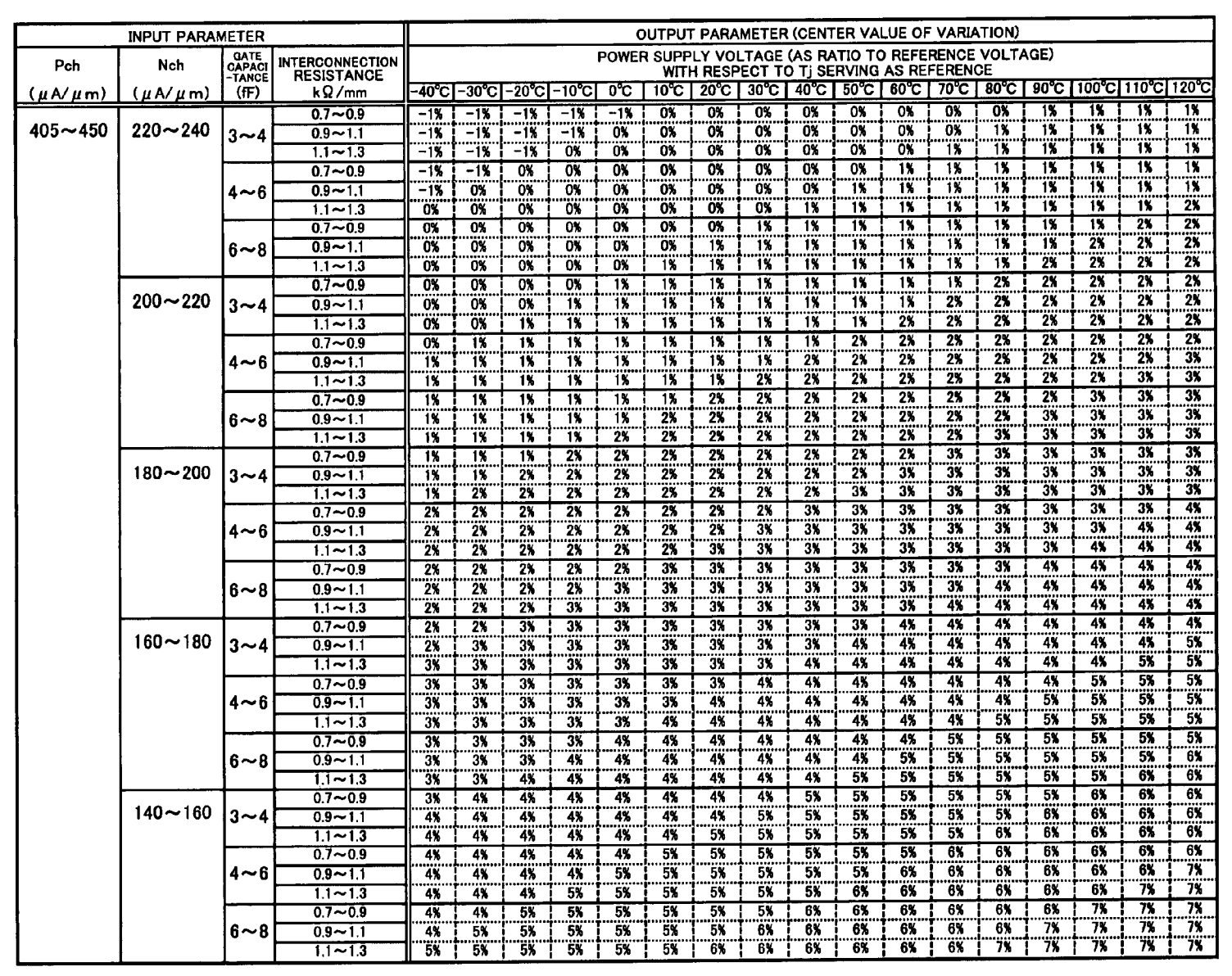
Figure 4F:
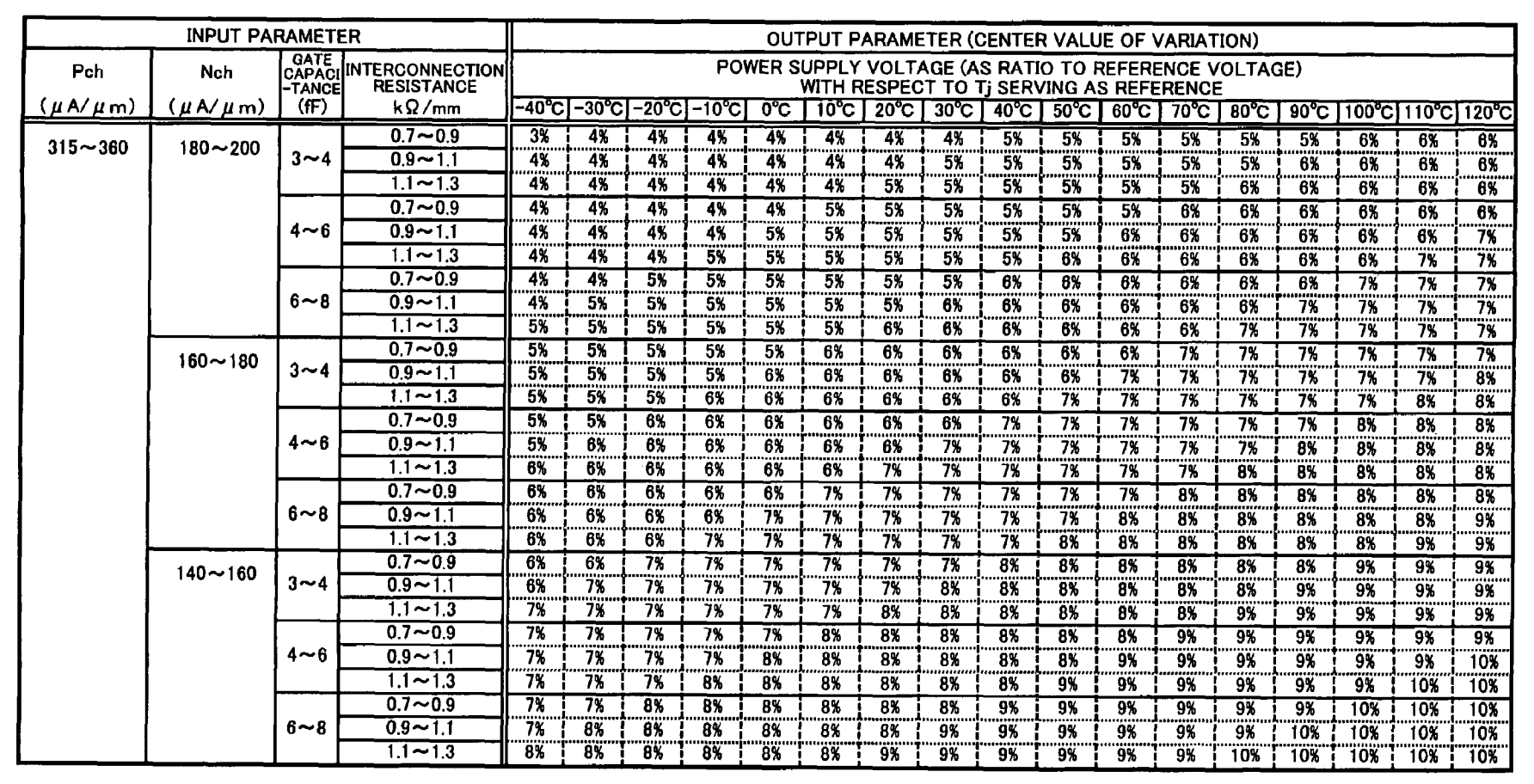

As the manufacturing process varies, the values of these input parameters indicative of circuit characteristics also vary. For example, FIG. 4A shows all the variation conditions within a range of 585 to 630 microamperes/micrometer for the P-cannel, FIG. 4B all the variation conditions within a range of 495 to 540 microamperes/micrometer for the P-cannel, and FIG. 4C all the variation conditions within a range of 450 to 495 microamperes/micrometer for the P-cannel.

The output parameter indicates a ratio of the power supply voltage to the reference voltage that achieves an operation of a typical condition (corresponding to the center of a variation range) when Tj (the junction temperature of a semiconductor) is at the temperature shown in the table. Due to process variation, the semiconductor integrated circuit ends up having a maximum delay (or operating speed), a minimum delay, or a typical delay that is in the middle therebetween. The output parameter indicates the power supply voltage and temperature that are required for each process variation to achieve such a typical delay (or operating speed). Under the conditions shown in the upper portion of the table of FIG. 4A, the amount of electric current per unit width of a transistor is relatively large (i.e., 585 to 630 microamperes/micrometer for a P-channel and 260 to 280 microamperes/micrometer for an N-channel), so that the circuit operation is relatively fast. Accordingly, a typical speed (or delay amount) is achieved with a relatively low power supply voltage (because the operating speed increases as the power supply voltage increases). Reflecting this fact, the power supply voltages are low voltages ranging from −10% to −7% in the upper portion of the table shown in FIG. 4A. As is well known, the larger the temperature Tj, the slower the operating speed is. Accordingly, as the temperature increases (as the point of interest moves to the right in the table), the required power supply voltage increases.

The manufactured semiconductor integrated circuit may be such that the P-channel is 585 to 630 microamperes/micrometer, the N-channel 260 to 280 microamperes/micrometer, the gate capacitance 4 fF to 6 fF, and the interconnection resistance 0.7 to 0.9 kilohms/millimeter (as shown in FIG. 4A). In such a case, the power supply voltage may be set to −10% if the temperature is −40 degrees Celsius, and may be set to −7% if the temperature is 80 degrees Celsius in order to properly operate the semiconductor integrated circuit. Alternatively, the manufactured semiconductor integrated circuit may be such that the P-channel is 495 to 540 microamperes/micrometer, the N-channel 240 to 260 microamperes/micrometer, the gate capacitance 4 fF to 6 fF, and the interconnection resistance 0.7 to 0.9 kilohms/millimeter (as shown in FIG. 4B). In such a case, the power supply voltage may be set to −3% in order to properly operate the semiconductor integrated circuit if the temperature is 30 degrees Celsius.

FIG. 5 is a flowchart for explaining the detail of the library generating step shown at step S5 of FIG. 3.

In order to generate a library, simulation software such as SPICE may be used to simulate the operation of an electronic circuit of each cell, thereby obtaining the gate-input capacitance, output-drive capability, delay time, and so on of each cell with respect to the maximum-speed condition (minimum-delay condition), the minimum-speed condition (maximum-delay condition), and the typical-speed condition (typical-delay condition). Step S1 is a step that computes the variation of cell characteristics by use of SPICE simulation. The inputs into the process of step S1 include a precision 20 of the system control of power supply voltage and temperature (i.e., the tolerable range allowed for the setting of power supply voltage and temperature), an estimated dynamic noise amount and dynamic IR drop amount in the package and LSI 21, and a system-supportable-range portion 22 of the variation table. Here, the dynamic IR drop amount refers to a voltage drop that occurs due to the resistance component when the power supply voltage propagates through a power supply line, and the dynamic noise refers to a coupling noise and the like. The provision of the dynamic IR drop amount and dynamic noise amount as input data does not directly relate to the present invention, and is also in existence in the related-art configuration.

The system-supportable-range portion 22 of the variation table refers to the range in which the power supply voltage and temperature are controllable on the system side in the variation table (e.g., FIGS. 4A through FIG. 4F) generated at step S3 of FIG. 3. The variation table shown in FIGS. 4A through 4F corresponds to a temperature range of −40 degrees Celsius to +120 degrees Celsius and a power-supply-voltage range of −10% to +10%. The temperature range within which the system designer can control the temperature may be from 0 degree Celsius to +80 degrees Celsius, and, also, the controllable power supply voltage range may be from −5% to +5%. In such a case, only the portion that corresponds to an output parameter temperature range of 0 degree Celsius to +80 degrees Celsius and a power supply voltage range of −5% to +5% is extracted from the variation table shown in FIGS. 4A through 4F. The data of this extracted portion of the variation table corresponds to the system-supportable-range portion 22 of the variation table shown in FIG. 5.

In the SPICE simulation performed at step S1 of FIG. 5, the gate-input capacitance, output-drive capability, delay time, and the like of each cell are computed for the maximum-speed condition and the minimum-speed condition by inputting the power supply voltage of the maximum-speed condition (the highest power supply voltage) and the power supply voltage of the minimum-speed condition (the lowest power supply voltage) within the tolerable range of power supply voltage controlled by the system and the temperature of the maximum-speed condition (the lowest temperature) and the temperature of the minimum-speed condition (the highest temperature) within the tolerable range of temperature controlled by the system. In so doing, the dynamic IR drop amount and dynamic noise amount may be taken into account in the same manner as in the related-art configuration.

When a process-variation-dependent circuit characteristic (specified by a row in the variation table) changes, the operating speed of the cell also changes. In the SPICE simulation for the related-art configuration, thus, the maximum-speed condition and minimum-speed condition need to be set by taking into account such process variation. In the present invention, however, such variation is compensated for at the time of system operation by using the power supply voltage and temperature specified in the variation table, so that the operation under a typical speed condition without regard to variation is assumed. In the SPICE simulation performed at step S1, therefore, the operating speed of a cell can be fixed to that of a typical condition.

If changes in the power supply voltage and temperature within the tolerable range can be assumed to have a constant effect on the operating speed despite the different circuit characteristics responsive to process variation, there is no need to take into account process variation in the SPICE simulation performed at step S1. In reality, however, changes in the operating speed responsive to changes in the power supply voltage and temperature within the tolerable range may vary in response to process variation. Accordingly, the SPICE simulation at step S1 should ideally be performed with respect to each process-variation-dependent circuit characteristic appearing in the system-supportable-range portion 22 of the variation table to obtain the values of the gate-input capacitance, output-drive capability, delay time, and so on of each cell for both the maximum-speed condition and the minimum-speed condition. The value for the maximum-speed condition and the value for the minimum-speed condition that are the largest in all the circuit characteristics may then be used in the library.

Alternatively, representative points may be selected from the system-supportable-range portion 22 of the variation table, and the values of the gate-input capacitance, output-drive capability, delay time, and so on of each cell may be obtained separately for each one of these representative points with respect to both the maximum-speed condition and the minimum-speed condition. The value for the maximum-speed condition and the value for the minimum-speed condition that are the largest in all the representative points may then be used in the library. Such representative points may be those corresponding to conditions at the borders of the system-supportable-range portion 22 of the variation table among the conditions contained in such portion (e.g., the points corresponding to the combinations of 0 degree Celsius or +80 degrees Celsius and −5% or +5% if the supportable-range is from 0 degree Celsius to +80 degrees Celsius and −5% to +5%).

At step S2 of FIG. 5, libraries designed to cover the range of variation that should be taken into account are generated. The simulation performed at step S1 described above generates libraries that cover the range of variation that should be taken into account. It is a well-known fact, however, that there is a slight error between the actual process-monitor measurements and the actual device characteristics. This is because the process monitor is only provided at a predetermined position on the wafer, so that changes in the characteristics responsive to changes in the position cannot be accurately known.

In consideration of this, the values obtained by the simulation at step S1 are corrected by taking into account a correlation error 23 (statistically obtained data) between process-monitor measurements and actual device characteristics. If it is known from the statistics that actual device characteristics have delays about 10% larger that those of the process-monitor measurements, for example, the delay obtained by the simulation may be corrected by the multiplication of 1.1.

According to the manner as described above, libraries designed to cover the range of variation that should be taken into account are generated. Physical designing and manufacturing will then be performed by use of these libraries as was previously described.

In the following, information that is passed to the system designer will be described. In the present invention, process-monitor measurements are obtained at step S7 of FIG. 1, and information indicative of the measured process is passed to the system designer (user). The information indicative of the measured process may be a variation table itself as shown in FIGS. 4A through 4F and an indication of which circuit characteristic (which row) in the variation table is the one that is used, for example. It suffices for the system side to operate the semiconductor integrated circuit by use of the temperature and power supply voltage that are specified in the indicated row of circuit characteristics appearing in the variation table. In so doing, an error in the temperature and power supply voltage is permitted within the expected tolerable range.

FIG. 6 is a drawing for explaining information that is passed to the system designer. In the present invention, process-monitor measurements may be grouped into different ranks, so that an indication of a rank may be passed to the system designer with respect to each semiconductor integrated circuit. FIG. 6 shows a table listing ranks A, B, C, which correspond to different combinations of a current amount per unit width of a P channel transistor, a current amount per unit width of an N channel transistor, a gate capacitance of a transistor, and a resistance per unit length of an interconnection obtained as process-monitor measurements. A semiconductor integrated circuit having rank A has a relatively fast operating speed, and an semiconductor integrated circuit having rank C has a relatively slow operating speed. A semiconductor integrated circuit having rank B has a medium operating speed. Either one of ranks A, B, and B will be reported to the system side.

FIGS. 7A and 7B are drawings illustrating correspondence tables that show correspondences between ranks, power supply voltages, and temperatures. Such a correspondence table is passed to the systems side together with the rank information. FIG. 7A shows a table used when the power supply voltage is changed while the temperature is fixed. FIG. 7B shows a table used when the temperature is changed while the power supply voltage is fixed. When a notice indicative of rank B is received, for example, the system designer controls the voltage such that it falls within a range of 1.15 V to 1.25V. When a notice indicative of rank C is received, for example, the system designer controls the voltage such that it falls within a range of 1.20 V to 1.30 V. In this case, the temperature suffices if it is between 25 degrees Celsius and 75 degrees Celsius.

Alternatively, when a notice indicative of rank B is received, for example, the system designer controls the temperature such that it falls within a range of 25 degrees Celsius to 75 degrees Celsius. When a notice indicative of rank C is received, for example, the system designer controls the temperature such that it falls within a range of −40 degrees Celsius to 30 degrees Celsius. In this case, the power supply voltage suffices if it is between 1.15 V and 1.25 V.

It is desirable to be able to control both temperature and power supply voltage. In order to control both, however, control becomes complex, resulting in a cost increase. In the case of a simple system configuration, therefore, provision may be made such that only one of the temperature and power supply voltage is controlled as shown in FIGS. 7A and 7B. If the system is capable of performing more diligent control, a variation table as shown in FIGS. 4A through 4F and an indication of a measured process variation may be provided as notice as previously described.

In order to give notice to the system side, information indicative of the measured process may be attached to an LSI, or may be printed on the LSI. Alternatively, fuses may be provided in an LSI, and are cut to record the process information. The fuse information may then be transferred to a register at the power-on of the LSI, so that it can be read by software. By the same token, fuses may be provided in an LSI, and are cut to record the process information, so that the process information is output from the output pins.

Figure 8:
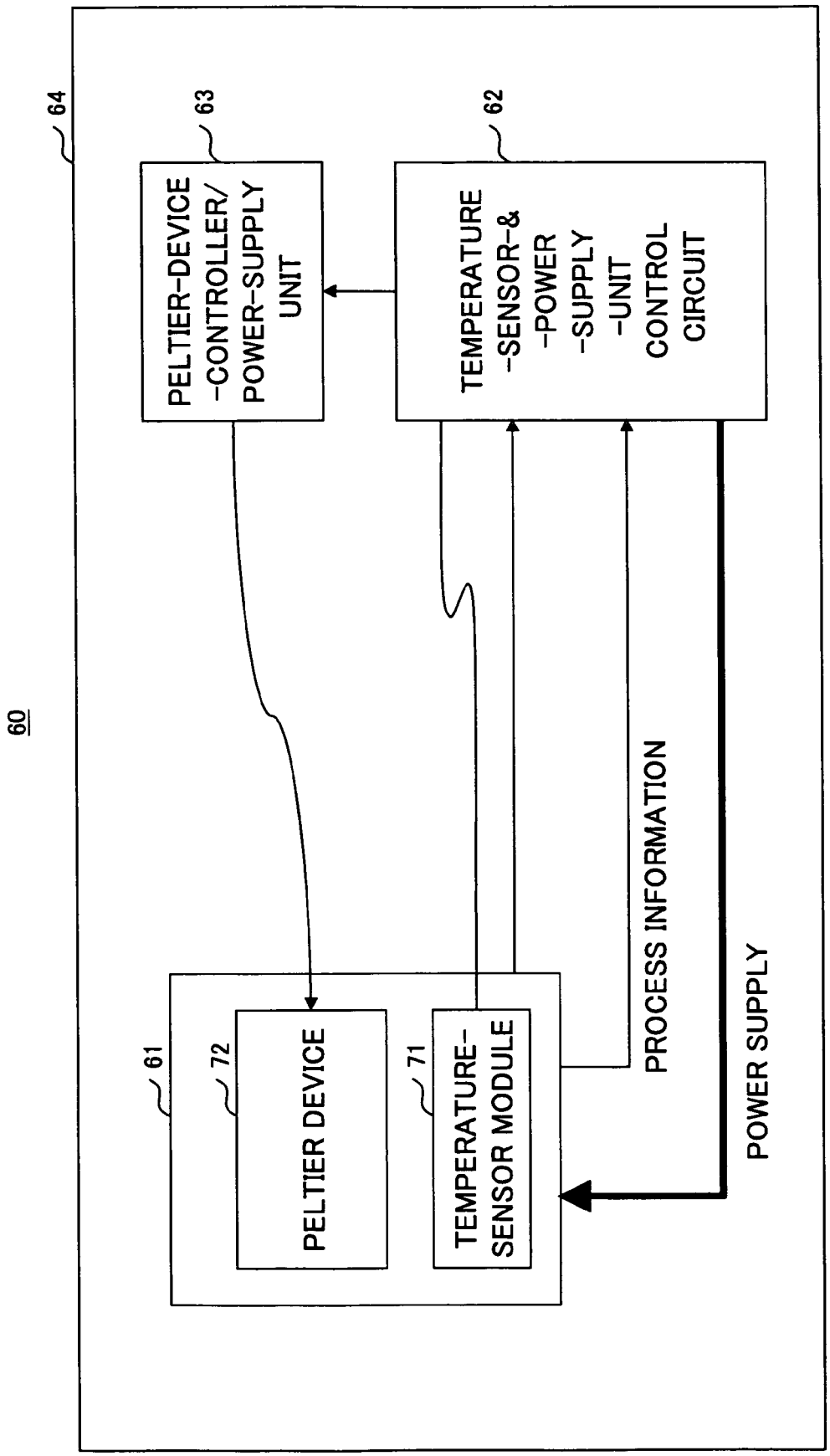
FIG. 8 is a drawing showing an example of a configuration for controlling temperature on the system side.

FIG. 8 is a drawing showing an example of a configuration for controlling temperature on the system side.

The system 60 of FIG. 8 includes a semiconductor device 61, a temperature-sensor-&-power-supply-unit control circuit 62, and a Peltier-device-controller/power-supply unit 63. The semiconductor device 61, the temperature-sensor-&-power-supply-unit control circuit 62, and the Peltier-device-controller/power-supply unit 63 are implemented on a printed circuit board 64.

The semiconductor device 61 includes a semiconductor integrated circuit encased in a package, a surface of which has a Peltier device 72 attached thereto. The Peltier device 72 is a device that utilizes the Peltier effect, by which the conduction of an electric current through a junction of two different metals causes heat to move from one of the metals to the other metal. The Peltier device 72 can move heat from one surface of the sheet-like device to the other surface. Reversal of the direction of the electric current applied to the Peltier device 72 changes the direction of heat shift, thereby switching between the heating and cooling of the semiconductor device 61. The surface of the package of the semiconductor device 61 also has a temperature-sensor module 71 attached thereto. The temperature-sensor module 71 measures the temperature of the package surface, and supplies a signal indicative of the result of temperature measurement to the temperature-sensor-&-power-supply-unit control circuit 62.

The temperature-sensor-&-power-supply-unit control circuit 62 controls the Peltier-device-controller/power-supply unit 63 in response to the signal indicative of the result of temperature measurement supplied from the temperature-sensor module 71 of the semiconductor device 61. As previously described, reversal of the direction of the electric current applied to the Peltier device 72 changes the direction of heat shift, thereby switching between the heating and cooling of the semiconductor device.

If the result of temperature measurement indicates that the temperature is about to fall below a predetermined operating temperature range, the temperature-sensor-&-power-supply-unit control circuit 62 controls the Peltier-device-controller/power-supply unit 63 such as to heat the semiconductor device 61 by use of the Peltier device 72. If the result of temperature measurement indicates that the temperature is about to rise above the predetermined operating temperature range, the temperature-sensor-&-power-supply-unit control circuit 62 controls the Peltier-device-controller/power-supply unit 63 such as to cool the semiconductor device 61 by use of the Peltier device 72. Further, the temperature-sensor-&-power-supply-unit control circuit 62 supplies a power supply voltage to the semiconductor device 61, thereby controlling the semiconductor device 61 such that it operates with a power supply voltage falling within a predetermined power supply voltage range.

The predetermined operating temperature range and predetermined power supply voltage range described above are responsive to the process information read from the semiconductor device 61. As was previously described, provision may be made such that the process information recorded in the fuses of the LSI may be output from the output pins. In this case, the temperature-sensor-&-power-supply-unit control circuit 62 reads the process information from the output pins of the semiconductor device 61, and performs control such that the power supply voltage and temperature are adjusted within the predetermined tolerable range centered at the power supply voltage and temperature specified by the process information.

In order to detect temperature, the temperature of the surface of the LSI package may be measured as described above, and Tj (i.e., junction temperature of the semiconductor) may be computed based on the obtained measurement. Alternatively, the electric power consumed by the LSI may be measured, so that Tj is computed based on such measurement. Alternatively, the operating speed of a logic circuit such as an inverter loop may be measured, and such measurement may then be converted into Tj temperature.

The method of controlling temperature is not limited to the method that uses a Peltier device as described above. A heating circuit may be provided inside the LSI, and a cooling system that adjusts air flow may be provided outside the LSI. Alternatively, a heat pump may be coupled to the package, so that forced cooling and heating may be performed by use of the heat pump.

Figure 9:
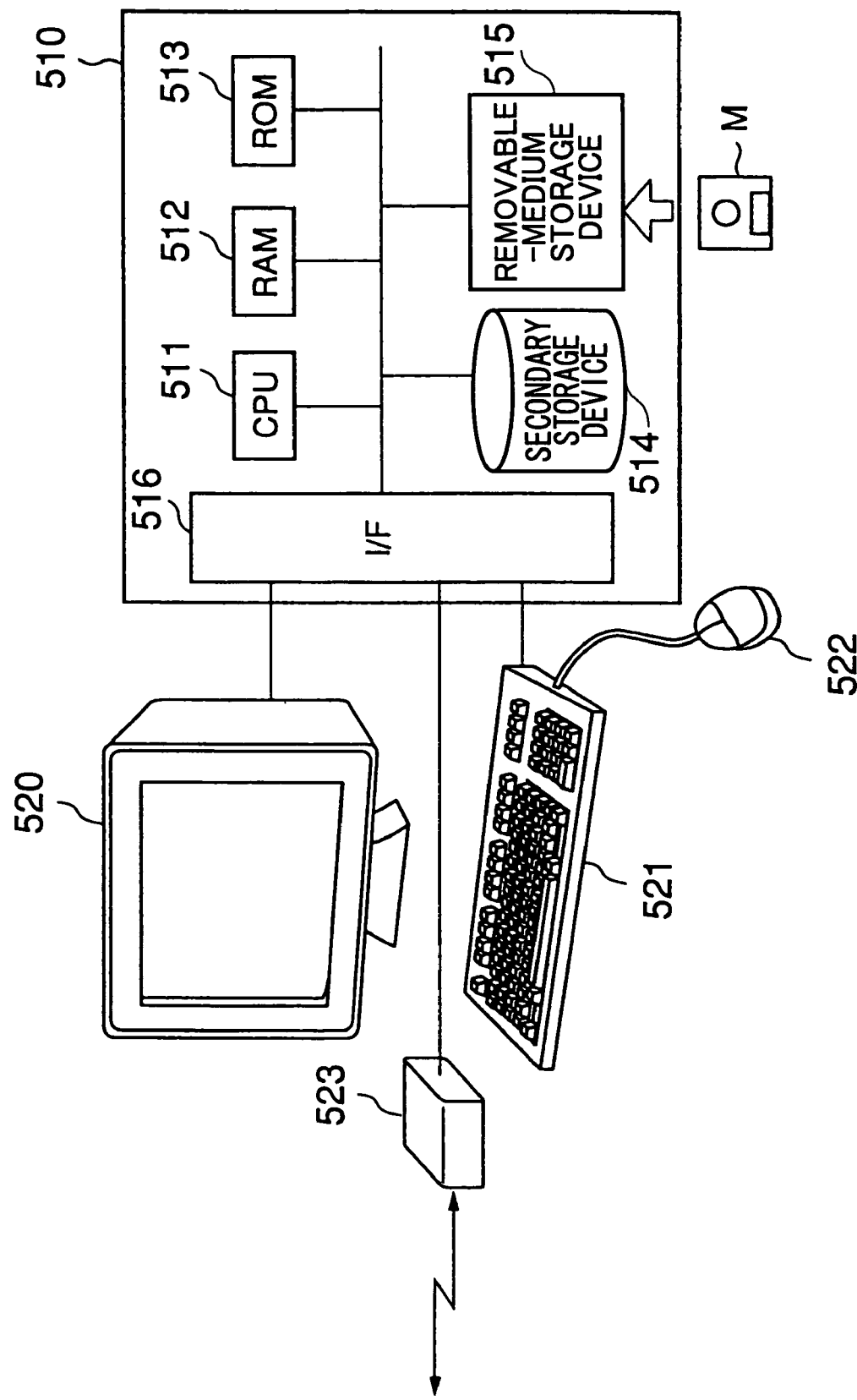
FIG. 9 is a drawing showing the configuration of an apparatus for performing the method of designing a semiconductor integrated circuit according to the present invention.

FIG. 9 is a drawing showing the configuration of an apparatus for performing the method of designing a semiconductor integrated circuit according to the present invention.

As shown in FIG. 9, the apparatus for performing the method of designing a semiconductor integrated circuit according to the present invention is implemented as a computer such as a personal computer, an engineering workstation, or the like The apparatus of FIG. 9 includes a computer 510, a display apparatus 520 connected to the computer 510, a communication apparatus 523, and an input apparatus. The input apparatus includes a keyboard 521 and a mouse 522. The computer 510 includes a CPU 511, a ROM 513, a secondary storage device 514 such as a hard disk, a removable-medium storage device 515, and an interface 516.

The keyboard 521 and mouse 522 provide user interface, and receive various commands for operating the computer 510 and user responses responding to data requests or the like. The display apparatus 520 displays the results of processing by the computer 510, and further displays various data that makes it possible for the user to communicate with the computer 510. The communication apparatus 523 provides for communication to be conduced with a remote site, and may include a modem, a network interface, or the like.

The method of designing a semiconductor integrated circuit according to the present invention is provided as a computer program executable by the computer 510. This computer program is stored in a memory medium M that is mountable to the removable-medium storage device 515. The computer program is loaded to the RAM 512 or to the secondary storage device 514 from the memory medium M through the removable-medium storage device 515. Alternatively, the computer program may be stored in a remote memory medium (not shown), and is loaded to the RAM 512 or to the secondary storage device 514 from the remote memory medium through the communication apparatus 523 and the interface 516.

Upon user instruction for program execution entered through the keyboard 521 and/or the mouse 522, the CPU 511 loads the program to the RAM 512 from the memory medium M, the remote memory medium, or the secondary storage device 514. The CPU 511 executes the program loaded to the RAM 512 by use of an available memory space of the RAM 512 as a work area, and continues processing while communicating with the user as such a need arises. The ROM 513 stores therein control programs for the purpose of controlling basic operations of the computer 510.

By executing the computer program as described above, the computer 510 performs the method of designing a semiconductor integrated circuit as described in the embodiments.

Further, the present invention is not limited to these embodiments, but various variations and modifications may be made without departing from the scope of the present invention.

What is claimed is:

1. An apparatus for designing a semiconductor integrated circuit, comprising:

a memory unit configured to store data and a program; and a processing unit configured to process the data stored in the memory by executing the program stored in the memory, wherein the processing unit performs:

defining a tolerable range in which an operating temperature and an operating power supply voltage of a semiconductor integrated circuit are allowed to vary;

computing a target temperature and a target power supply voltage that cancel variation in circuit characteristics caused by process variation of the semiconductor integrated circuit, separately for each circuit characteristic responsive to the process variation; and designing the semiconductor integrated circuit such that the semiconductor integrated circuit properly operates with any temperature and power supply voltage within the tolerable range based on an assumption that the semiconductor integrated circuit is to operate within the tolerable range centered substantially at the target temperature and target power supply voltage.

* * * * *